United States Patent
Prahlad et al.

(10) Patent No.: US 10,421,613 B2
(45) Date of Patent: Sep. 24, 2019

(54) ELECTROADHESIVE TILT SORTER AND CONTROL SYSTEM

(71) Applicant: Grabit, Inc., Sunnyvale, CA (US)

(72) Inventors: Harsha Prahlad, Cupertino, CA (US); Matthew Thomas Leettola, Rocklin, CA (US); Teh Kian Weng, Kajang (MY)

(73) Assignee: Grabit, Inc., Sunnyvale, CA (US)

( * ) Notice: Subject to any disclaimer, the term of this patent is extended or adjusted under 35 U.S.C. 154(b) by 0 days.

(21) Appl. No.: 16/284,508

(22) Filed: Feb. 25, 2019

(65) Prior Publication Data
US 2019/0263595 A1    Aug. 29, 2019

Related U.S. Application Data

(60) Provisional application No. 62/634,577, filed on Feb. 23, 2018.

(51) Int. Cl.
| | |
|---|---|
| *B65G 17/46* | (2006.01) |
| *B03C 7/00* | (2006.01) |
| *B03C 7/08* | (2006.01) |
| *H02N 13/00* | (2006.01) |

(52) U.S. Cl.
CPC ............. *B65G 17/46* (2013.01); *B03C 7/08* (2013.01); *B03C 2201/00* (2013.01); *H02N 13/00* (2013.01)

(58) Field of Classification Search
CPC .................................. B65G 17/46; B03C 7/00
USPC .......... 198/358, 350, 360, 370.01, 436, 437; 700/228, 229, 230; 361/230
See application file for complete search history.

(56) References Cited

U.S. PATENT DOCUMENTS

| | | | | |
|---|---|---|---|---|
| 5,996,316 A | * | 12/1999 | Kirschner | B65G 1/1378 |
| | | | | 53/155 |
| 6,314,337 B1 | * | 11/2001 | Marcum | B23P 21/00 |
| | | | | 198/358 |
| 6,609,607 B2 | * | 8/2003 | Woltjer | B65G 37/02 |
| | | | | 198/457.03 |
| 8,060,243 B2 | * | 11/2011 | Ogawa | B65G 43/08 |
| | | | | 198/358 |
| 8,499,920 B2 | * | 8/2013 | Ogawa | G06M 7/04 |
| | | | | 198/358 |
| 8,861,171 B2 | * | 10/2014 | Prahlad | B25J 15/0009 |
| | | | | 361/234 |
| 9,093,926 B2 | * | 7/2015 | Prahlad | B25J 15/0085 |
| 9,126,769 B2 | * | 9/2015 | Bauer | B65G 47/715 |

(Continued)

*Primary Examiner* — Douglas A Hess
(74) *Attorney, Agent, or Firm* — Rowan TELS LLC

(57) ABSTRACT

A system to sort packages or parcels into chutes includes a package and parcel transporting component with a plurality of zones, each coupled to an electroadhesive material. The package and parcel transporting component is operable to move the plurality of zones. The electroadhesive material includes electrodes to exert an electroadhesive force and dynamically electrically couple to be energized by an applied voltage on demand. The system includes a controller to determine chutes into which to release packages or parcels and determine zones associated with packages or parcels. The controller selects zones associated with the packages or parcels to transport or release packages or parcels. The controller operates the electrodes to alter the electroadhesive material in the zones associated packages or parcels to transport and release the packages or parcels to one or more chutes.

19 Claims, 10 Drawing Sheets

(56) References Cited

U.S. PATENT DOCUMENTS

| | | | |
|---|---|---|---|
| 9,401,668 B2* | 7/2016 | Prahlad | H02N 13/00 |
| 9,486,814 B2* | 11/2016 | Prahlad | B03C 7/08 |
| 9,771,222 B2* | 9/2017 | Schroader | B65G 43/08 |
| 9,929,680 B2* | 3/2018 | Spicer | H02N 13/00 |
| 9,987,755 B2* | 6/2018 | Prahlad | B25J 15/0085 |
| 10,221,015 B2* | 3/2019 | Battles | B65G 1/137 |
| 2019/0152720 A1* | 5/2019 | Kuhn | |

* cited by examiner

ELECTROADHESIVE TILT SORTER AND CONTROL SYSTEM

CROSS-REFERENCE TO RELATED APPLICATIONS

This application claims the benefit of U.S. Provisional Application Ser. No. 62/634,577, filed Feb. 23, 2018, the entire content of which is incorporated by reference herein.

BACKGROUND

Goods to be sorted may have various sizes, mixtures, weights, shapes, etc. Conventional sorters may utilize features that have low through-puts, utilize many moving parts, and thus may have a high cost of ownership (e.g., capital, maintenance, deployment time, and operating cost). A high performance sorter operating at lower cost may be utilized or an existing sorter may be retro-fitted to increase performance.

BRIEF SUMMARY

A system to sort one or more packages or parcels into one or more chutes includes a package and parcel transporting component. The package and parcel transporting component may be tilted at an angle relative to a gravitational source to induce the one or more packages or parcels to move relative to the package and parcel transporting component unless a controlled external force is applied to it. The package and parcel transporting component may include a plurality of zones, each of the plurality of zones coupled to an electroadhesive material. The electroadhesive material may have a de-activated state and an activated state. The activated state may preclude the one or more packages or parcels from moving relative to the package and parcel transporting component due to the gravitational source. The package and parcel transporting component may be operable to move the plurality of zones. The system may include one or more electrodes. Each of the one or more electrodes may exert an electroadhesive force on the one or more packages or parcels. Each of the one or more electrodes may also dynamically electrically couple to be energized by an applied voltage on demand. The system may include at least one sensor. The at least one sensor may determine two or more zones of the plurality of zones associated with the one or more packages or parcels.

The system may include a controller. The controller may determine one of the one or more chutes into which to release each of the one or more packages or parcels. The controller may determine the two or more zones associated with each of the one or more packages or parcels. The controller may select one or more of the two or more zones associated with each of the one or more packages or parcels to transport or release each of the one or more packages or parcels. The controller may operate the one or more electrodes to selectively couple between a ground source and a voltage source to alter the electroadhesive material in each of the one or more of the two or more zones associated with each of the one or more packages or parcels selected between the activated state and the de-activated state to transport and release the one or more packages or parcels to the one of the one or more chutes.

In some configurations, the controller alters the one or more zones may be associated with one or more of the one or more packages or parcels based on the sensor detecting an additional package or parcel.

In some configurations, each of the plurality of zones may be associated with two or more of the one or more packages or parcels.

In some configurations, the plurality of zones may have a width based on a minimum package or parcel width and a zone distance based on a minimum arc distance. The one or more zones may be associated with each of the one or more packages or parcels determined in response to being detected by the sensor, the sensor detecting a length of the one or more packages or parcels. The sensor may also detect a location and a dimension of the one or more packages or parcels to determine the one or more zones of the plurality of zones associated with the one or more packages or parcels.

In some configurations, the package and parcel transporting component may include one or more openings. The package and parcel transporting component may also include one or more vacuum generators, where the one or more vacuum generators may provide a vacuum force through the one or more openings to the one or more packages or parcels.

In some configurations, the electroadhesive material may be the sensor. In this configuration, the controller may receive an indication of an electric current of the electroadhesive material in each of the plurality of zones.

In some configurations, the one or more electrodes may operate as one or more electrode pairs. The one electrode of an electrode pair may be configured to couple to a positive voltage source and the other electrode of the electrode pair configured to couple to a negative voltage source.

In some configurations, the one or more electrodes may be one or more brushes. In this configuration, the package and parcel transporting component may include one or more openings to enable the electroadhesive material to contact the one or more brushes.

In some configurations, the system includes one or more package and parcel detaching components.

In some configurations, the package and parcel transporting component may include a plurality of modules. In this configuration each of the plurality of modules may include two or more of the plurality of zones. The plurality of modules may also operate to move the two or more of the plurality of zones. In this configuration, the controller may determine which of the plurality of modules are associated with each of the one or more packages or parcels.

In some configurations, operating the controller to select the one or more of the two or more zones associated with each of the one or more packages or parcels to transport or release each of the one or more packages or parcels may further include determining the one or more electrodes associated with each of the two or more zones associated with each of the one or more packages or parcels. The controller may determine which of the one or more electrodes to be in the de-activated state to release the one or more packages or parcels to be released. The controller may also select at least one of the one or more electrodes associated with one of the two or more zones associated with the one or more packages or parcels and not determined to be in the de-activated state to release the one or more packages or parcels to be released to be in the activated state.

In some configurations, the system may also include one or more inducts coupled to and oriented perpendicular to the package and parcel transporting component. The one or more inducts may receive the one or more packages or parcels and send the one or more packages or parcels to the package and parcel transporting component.

In some configurations, the package and parcel transporting component may include a first end and a second end, the one or more inducts sending the one or more packages or parcels to the first end of the package and parcel transporting component and the package and parcel transporting component releasing the one or more packages or parcels into the one or more chutes at the second end.

A method involves receiving one or more packages or parcels. The method associates a package and parcel transporting component having a plurality of zones with the one or more packages or parcels. The method then associates one or more zones of the plurality of zones with each of the one or more packages or parcels based on information provided by a sensor that detects a location and a dimension of the one or more packages or parcels. The method then determines one of one or more chutes to release each of the one or more packages or parcels. The method then operates the package and parcel transporting component at an angle tilted relative to a gravity force to move the one or more packages or parcels. The method then alters a state of an electroadhesive material associated with each of the plurality of zones to adhere or release the one or more packages or parcels to or from the package and parcel transporting component. Altering the state of the electroadhesive material allows the package and parcel transporting component to transport the one or more packages or parcels to the one or more chutes and release each of the one or more packages or parcels into the one of the one or more chutes to which the one of the one or more packages or parcels is associated.

In some configurations, each of the one or more packages or parcels is associated with one or more zones of the plurality of zones of the package and parcel transporting component in response to being detected by the sensor.

In some configurations, the method redetermines the one or more zones associated with each of the one or more packages or parcels in response to the sensor detecting an additional package or parcel.

In some configurations, the package and parcel transporting component comprises a plurality of modules, the state of the electroadhesive material altered to further transfer each of the one or more packages or parcels from one of the plurality of modules to another of the plurality of modules.

In some configurations, the method determines one or more electrodes associated with each of the two or more zones associated with each of the one or more packages or parcels. The method then determines which of the one or more electrodes to be in a de-activated state to release the one or more packages or parcels to be released. The method then selects at least one of the one or more electrodes associated with one of the two or more zones associated with the one or more packages or parcels and not determined to be in the de-activated state to release the one or more packages or parcels to be released to be in an activated state. The method then activates the at least one of the one or more electrodes selected.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
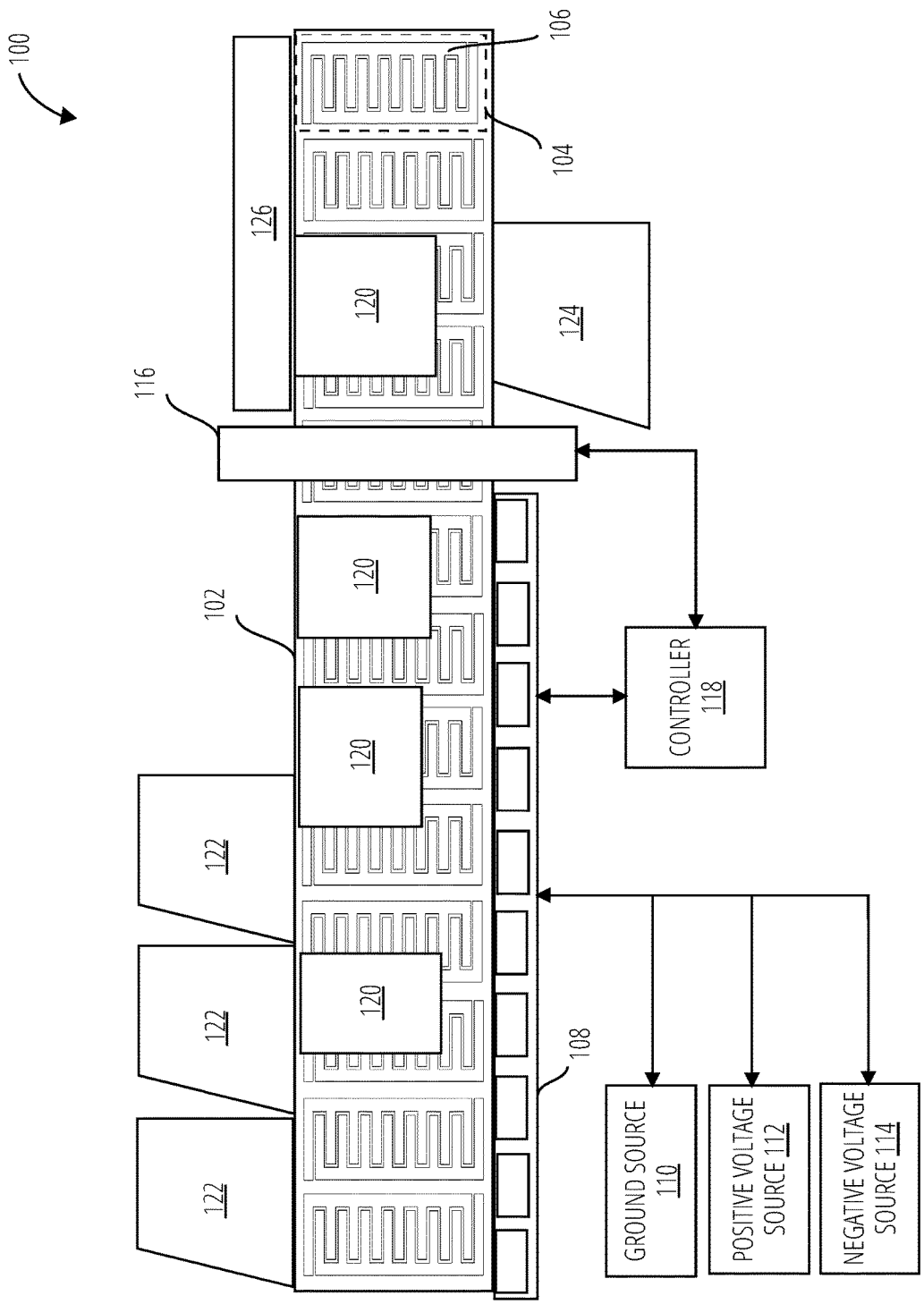
FIG. 1 illustrates a top view of an embodiment of a sorter system 100.

"Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" refers to software logic embodied as processor-executable instructions stored in read-only memories or media.

"Hardware" refers to logic embodied as analog or digital circuitry.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" refers to logic implemented as processor-executable instructions in a machine memory (e.g. read/write volatile or nonvolatile memory or media).

"Camera" refers to an optical instrument for recording or capturing images, which may be stored locally, transmitted to another location, or both.

"Chute" refers to a vertical or inclined plane, channel, or passage through which objects are moved by means of gravity.

"Classifier" refers to a specific type of correlator/associator logic that associates one or more inputs with a category, class, or other group sharing one or more common characteristics. An example of a classifier that may commonly be implemented in programmable hardware is a packet classifier used in network switches, firewalls, and routers (e.g., packet classifiers utilizing Ternary Content Addressable Memories). An example software or firmware classifier is: if (input1.value<12.5) input1.group=group1; else if (input1.value>=12.5 and input1.value<98.1) input1.group=group2; else input1.group=group3; Other examples of classifiers will be readily apparent to those of skill in the art, without undo experimentation.

"Combiner" refers to a logic element that combines two or more inputs into fewer (often a single) output. Example hardware combiners are arithmetic units (adders, multipliers, etc.), time-division multiplexers, and analog or digital modulators (these may also be implemented is software or firmware). Another type of combiner builds an association table or structure (e.g., a data structure instance having members set to the input values) in memory for its inputs. For example: val1, val2, val3→combiner logic→{val1, val2, val3} set.val1=val1; set.val2=val2; set.val3=val3; Other examples of combiners will be evident to those of skill in the art without undo experimentation.

"Comparator" refers to a logic element that compares two or more inputs to produce one or more outputs that reflects similarity or difference of the inputs. An example of a hardware comparator is an operational amplifier that outputs a signal indicating whether one input is greater, less than, or about equal to the other. An example software or firmware comparator is: if (input1==input2) output=val1; else if (input1>input2) output=val2; else output=val3; Many other examples of comparators will be evident to those of skill in the art, without undo experimentation.

"Controller" refers to logic, collection of logic, or circuit that coordinates and controls the operation of one or more input/output devices and synchronizes the operation of such devices with the operation of the system as a whole. For example, the controller may operate as a component or a set of virtual storage processes that schedules or manages shared resources. For example, IF (controller.logic {device1|device2|device3} {get.data( ), process.data( ), store.data( )}), —device1 get.data(input1)→data. input1; —device2 process.data(data.input1)→formatted.data1→—device3 store.data(formatted.data1).

"Conveyor" refers to a piece of mechanical handling equipment that moves materials from one location to another.

"Correlator" refers to a logic element that identifies a configured association between its inputs. One examples of a correlator is a lookup table (LUT) configured in software or firmware. Correlators may be implemented as relational databases. An example LUT correlator is: |low_alarm_condition|low_threshold_value|0||safe_condition|safe_lower_bound|safe_upper_bound||high_alarm_condition-|high_threshold_value|0| Generally, a correlator receives two or more inputs and produces an output indicative of a mutual relationship or connection between the inputs. Examples of correlators that do not use LUTs include any of a broad class of statistical correlators that identify dependence between input variables, often the extent to which two input variables have a linear relationship with each other. One commonly used statistical correlator is one that computes Pearson's product-moment coefficient for two input variables (e.g., two digital or analog input signals). Other well-known correlators compute a distance correlation, Spearman's rank correlation, a randomized dependence correlation, and Kendall's rank correlation. Many other examples of correlators will be evident to those of skill in the art, without undo experimentation.

"Incrementer" refers to logic to advance (increase or decrease) a counting or index value by a fixed or predictably variable amount. Examples of hardware incrementers include adder arithmetic circuits and counter circuits. An example of a software incrementer is: x=x+incrementValue. Incrementers may be used as counters, or as logic to advance a referencial or associative index in a memory data structure.

"Infrared camera" refers to a device that forms an image using infrared radiation, similar to a common camera that forms an image using visible light.

"Infrared sensor" refers to an electronic sensor that measures infrared (IR) light radiating from objects in its field of view.

"LIDAR sensor" refers to a sensor that measures distance to a target by illuminating that target with a pulsed laser light, and measuring the reflected pulses.

"Parser" refers to logic that divides an amalgamated input sequence or structure into multiple individual elements. Example hardware parsers are packet header parsers in network routers and switches. An example software or firmware parser is: aFields=split("val1, val2, val3", ","); Another example of a software or firmware parser is: readFromSensor gpsCoordinate; x_pos=gpsCoordinate.x; y_pos=gpsCoordinate.y; z_pos=gpsCoordinate.z; Other examples of parsers will be readily apparent to those of skill in the art, without undo experimentation.

"RADAR sensor" refers to an object-detection sensor that uses radio waves to determine the range, angle, or velocity of objects.

"Rules engine" refers to logic to detect events from data that is either captured or computed determined by matching data attributes to list of defined events. An example of a software or hardware rules engine is: If (messageType="Priority") output actionMessage to device2.

"Selector" refers to a logic element that selects one of two or more inputs to its output as determined by one or more selection controls. Examples of hardware selectors are multiplexers and demultiplexers. An example software or firmware selector is: if (selection_control==true) output=input1; else output=input2; Many other examples of selectors will be evident to those of skill in the art, without undo experimentation.

"Sequencer" refers to logic to generate an ordered list of outputs from either an unordered or partially ordered set of inputs, or from a starting input and rules to generate next inputs. One attribute of a sequencer is that the outputs are done sequentially, meaning one after the other in time. An example of a hardware sequencer is a multiplexer with a counter driving its selection input. An example of a software or firmware sequencer is: out=val++; Other examples of hardware and software or firmware sequencers will now be readily apparent to those of skill in the relevant arts.

"Ultrasound sensor" refers to a sensor that evaluate targets by interpreting the reflected sound signals.

A system to sort one or more packages or parcels into one or more chutes comprises a package and parcel transporting component, the package and parcel transporting component tilted at an angle relative to a gravitational source to induce the one or more packages or parcels to move relative to the package and parcel transporting component unless a controlled external force is applied to it. The package and parcel transporting component comprising a plurality of zones, each of the plurality of zones coupled to an electroadhesive material. The electroadhesive material having a de-activated state and an activated state. The activated state precluding the one or more packages or parcels from moving relative to the package and parcel transporting component due to the gravitational source. The package and parcel transporting component operable to move the plurality of zones.

The system comprises one or more electrodes. Each of the one or more electrodes exerts an electroadhesive force on the one or more packages or parcels and dynamically electrically couple to be energized by an applied voltage on demand.

They system comprises at least one sensor to determine two or more zones of the plurality of zones associated with the one or more packages or parcels.

The system comprises a controller. The controller determines one of the one or more chutes into which to release each of the one or more packages or parcels. The controller determines the two or more zones associated with each of the one or more packages or parcels. The controller selects one or more of the two or more zones associated with each of the one or more packages or parcels to transport or release each of the one or more packages or parcels. The controller operates the one or more electrodes to selectively couple between a ground source and a voltage source to alter the electroadhesive material in each of the one or more of the two or more zones associated with each of the one or more packages or parcels selected between the activated state and the de-activated state to transport and release the one or more packages or parcels to the one of the one or more chutes.

In an embodiment, the controller alters the one or more zones associated with one or more of the one or more packages or parcels based on the sensor detecting an additional package or parcel.

In some embodiments, each of the plurality of zones may be associated with two or more of the one or more packages or parcels.

In some embodiments, the plurality of zones have a width based on a minimum package or parcel width and a zone distance based on a minimum arc distance, the one or more zones associated with each of the one or more packages or parcels determined in response to being detected by the sensor, the sensor detecting a length of the one or more packages or parcels. In some configurations, the sensor detects a location and a dimension of the one or more packages or parcels to determine the one or more zones of the plurality of zones associated with the one or more packages or parcels.

In some embodiments, the package and parcel transporting component further comprises one or more openings, further comprising one or more vacuum generators, the one or more vacuum generators providing a vacuum force through the one or more openings to the one or more packages or parcels.

In some embodiments, the electroadhesive material is the sensor, the controller receiving an indication of an electric current of the electroadhesive material in each of the plurality of zones.

In some embodiments, the one or more electrodes operate as one or more electrode pairs, one electrode of an electrode pair configured to couple to a positive voltage source and the other electrode of the electrode pair configured to couple to a negative voltage source.

In some embodiments, the one or more electrodes are one or more brushes, the package and parcel transporting component having one or more openings to enable the electroadhesive material to contact the one or more brushes.

In some embodiments, the system further comprising one or more package and parcel detaching components.

In some embodiments, the package and parcel transporting component comprises a plurality of modules. Each of the plurality of modules comprise two or more of the plurality of zones. Each of the plurality of modules operate to move the two or more of the plurality of zones. The controller determines which of the plurality of modules are associated with each of the one or more packages or parcels.

In some embodiments, selecting the one or more of the two or more zones associated with each of the one or more packages or parcels to transport or release each of the one or more packages or parcels further comprises determining the one or more electrodes associated with each of the two or more zones associated with each of the one or more packages or parcels. Additionally, selecting the one or more of the two or more zones associated with each of the one or more packages or parcels to transport or release each of the one or more packages or parcels further comprises determining which of the one or more electrodes to be in the de-activated state to release the one or more packages or parcels to be release. Still selecting the one or more of the two or more zones associated with each of the one or more packages or parcels to transport or release each of the one or more packages or parcels further comprises selecting at least one of the one or more electrodes associated with one of the two or more zones associated with the one or more packages or parcels and not determined to be in the de-activated state to release the one or more packages or parcels to be released to be in the activated state.

In some embodiments, the system further comprises one or more inducts coupled to and oriented perpendicular to the package and parcel transporting component to receive the one or more packages or parcels and send the one or more packages or parcels to the package and parcel transporting component. In some configurations, the package and parcel transporting component has a first end and a second end, the one or more inducts sending the one or more packages or parcels to the first end of the package and parcel transporting component and the package and parcel transporting component releasing the one or more packages or parcels into the one or more chutes at the second end.

A method involves receiving one or more packages or parcels. The method associates a package and parcel transporting component having a plurality of zones with the one or more packages or parcels. The method associates one or more zones of the plurality of zones with each of the one or more packages or parcels based on information provided by a sensor that detects a location and a dimension of the one or more packages or parcels. The method determines one of one or more chutes to release each of the one or more packages or parcels. The method operates the package and parcel transporting component at an angle tilted relative to a gravity force to move the one or more packages or parcels. The method alters a state of an electroadhesive material associated with each of the plurality of zones to adhere or release the one or more packages or parcels to or from the package and parcel transporting component to transport the one or more packages or parcels to the one or more chutes and release each of the one or more packages or parcels into the one of the one or more chutes to which the one of the one or more packages or parcels is associated.

In some embodiments, each of the one or more packages or parcels is associated with one or more zones of the plurality of zones of the package and parcel transporting component in response to being detected by the sensor.

In some embodiments, the method involves redetermining the one or more zones associated with each of the one or more packages or parcels in response to the sensor detecting an additional package or parcel.

In some embodiments, the method involves determining one or more electrodes associated with each of the two or more zones associated with each of the one or more packages or parcels. The method also involves determining which of the one or more electrodes to be in a de-activated state to release the one or more packages or parcels to be released. The method additionally involves selecting at least one of the one or more electrodes associated with one of the two or more zones associated with the one or more packages or parcels and not determined to be in the de-activated state to release the one or more packages or parcels to be released to be in an activated state. The method also involves activating the at least one of the one or more electrodes selected.

Referring to FIG. 1, the sorter system 100 comprises a package and parcel transporting component 102, a zone 104, an electroadhesive material 106, a one or more electrodes 108, a ground source 110, a positive voltage source 112, a negative voltage source 114, a sensor 116, a controller 118, a one or more packages or parcels 120, a one or more chutes 122, an induct 124, and a mechanical guide 126.

Figure 2:
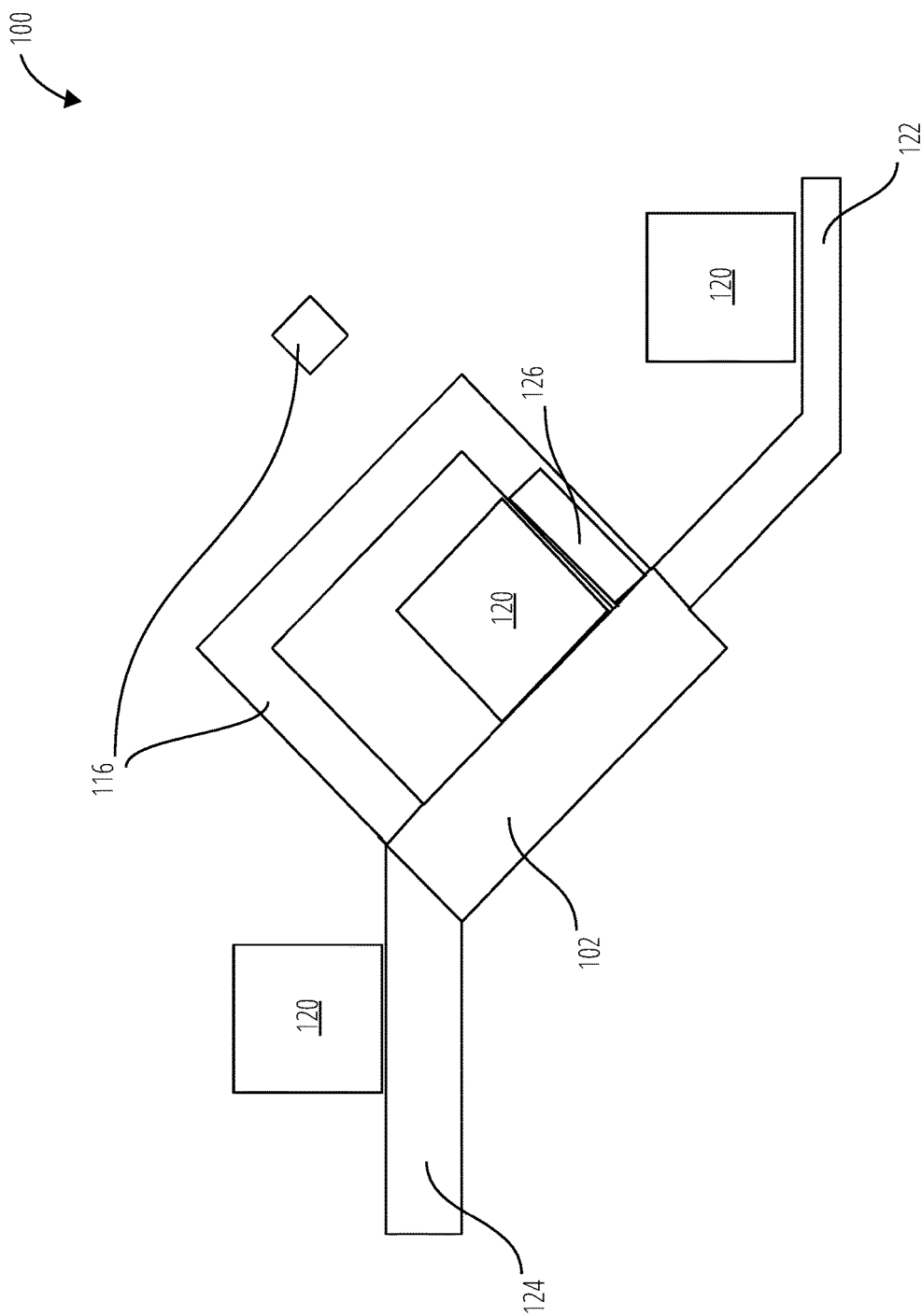
FIG. 2 illustrates a rear view of an embodiment of a sorter system 100.

The package and parcel transporting component 102 has a surface upon which the one or more packages or parcels 120 may contact. The surface may be a belt or one or more slats. The package and parcel transporting component 102 may further comprise a rigid structure to support the belt or one or more slats and the one or more packages or parcels 120. The package and parcel transporting component 102 is further configured to move the belt or one or more slats. The belt or one or more slats and the structure may also comprise mating components to help ensure the package and parcel transporting component 102 operates to transport the one or more packages or parcels 120. As depicted, the package and parcel transporting component 102 moves the depicted top surface to the left in FIG. 1 and into the page in FIG. 2. The package and parcel transporting component 102 is tilted in one perpendicular direction, such that the transport is transverse to the tilt. As depicted, the package and parcel transporting component 102 is tilted such that the bottom edge is higher than the top edge. The angle and the friction of the package and parcel transporting component 102 may be such that the one or more packages or parcels 120 may naturally slide off the top edge due to a gravitational source unless held by an electroadhesive or vacuum force adhering it to the package and parcel transporting component 102. The package and parcel transporting component 102 may be divided into a plurality of zones, such as the zone 104 and may include or be attached to one or more electroadhesive material, such as the electroadhesive material 106. The package and parcel transporting component 102 may have a surface that is optimized to enhance the electroadhesive force caused by the electroadhesive material 106. In some embodiments, the package and parcel transporting component 102 may have openings (e.g., holes) cut into it, and the fixed structure that the component runs on may include vacuum generators (compressors or fabs that augment the electroadhesive forces exerted on the one or more packages or parcels 120 with vacuum forces exerted by the vacuum generators through the package and parcel transporting component 102).

The zone 104 is a portion of the package and parcel transporting component 102 that may be associated with an electroadhesive portion that can be individually turned on and off relative to other zones including neighboring zones. As depicted, the zone 104 is associated with the electroadhesive material 106. In some embodiments, the zone 104 may be associated with more than one electroadhesive material. The zone distance, between each zone, may be based on the minimum width of the expected one of the one or more packages or parcels 120. The electroadhesive material 106 (or printed region) may be spaced apart based on the distance to inhibit arcing between the areas of electroadhesive material 106.

The electroadhesive material 106 (or printed region) is part of or attached to the package and parcel transporting component 102. Multiple electroadhesive material 106 (or printed regions) may be attached to or printed on the package and parcel transporting component 102 and each of the electroadhesive material 106 may be in a zone 104. The electroadhesive material 106 may contact the one or more of the one or more electrodes 108 as the electroadhesive material 106 is moved due to the operation of the package and parcel transporting component 102. The electroadhesive material 106 may always be in contact with at least one of the one or more electrodes 108. The electroadhesive material 106 may include zone bus bars (e.g., on the back side, or inner side of the belt of the package and parcel transporting component 102). Connection between the portions of the electroadhesive material 106 (or pattern) that induces electroadhesive forces on the package and parcel and the bottom of the package and parcel transporting component 102 may be made through conductive fibers, conductive staples, or holes that are filled with conductive grease or epoxy. The bottom of the transporting component may have a different pattern than the depicted top pattern of the electroadhesive material 106, and is in contact with electrode 108 such that the charge on electrode 108 can be transmitted to the electroadhesive material 106 (or pattern) through the conductive fibers, conductive staples or holes filled with conductive grease or epoxy. The pattern of the electroadhesive material 106 may be as depicted or another pattern. Each pattern may have two areas that are electrically decoupled, such that each area may contact one of the one or more electrodes 108. Those electrode pairs may be operated to alter the state of the electroadhesive material 106. The pattern of the electroadhesive material 106 comprises finger-shaped perpendicular extensions in addition to the depicted pattern. The patterns of the electroadhesive material 106 are separate from each other such each individual region can be independently controlled to have or not have electroadhesion, and so that if one region is damaged or shorted, there may be no effect on other regions.

The one or more electrodes 108 may contact each of the electroadhesive material 106. The one or more electrodes 108 may receive a control signal from the controller 118 to alter its state between ground, positive voltage, or the negative voltage. The state of the one or more electrodes 108 may be altered dynamically and on demand. The one or more electrodes 108 may operate as one or more electrode pairs. The electroadhesive material 106 (or region) requires relatively high voltage (300-8000V depending on the application), and each electrode 108 may be addressed as ground, positive or negative charge at this high voltage. One of the ways to achieve this is by selectively connecting each of the electrode 108 to one of either a ground source 110, positive high voltage source 112, or a negative high voltage source 114. This may be achieved through solid state switches or relays. In some embodiments, if the electrode pair is connected to the ground source 110, the electroadhesive material 106 contacting the pair is in a de-activated state. If the electrode pair is connected to the positive voltage source 112 and the negative voltage source 114, the electroadhesive material 106 contacting the pair is in an activated state. The polarity of the electrode pair may be switched between positive high voltage source 112 and negative high voltage source 114 to prevent charge buildup in electroadhesive material 106. In the activated state, one of the one or more packages or parcels 120 that rests upon the electroadhesive material 106 adheres to the electroadhesive material 106 (and thus the package and parcel transporting component 102), resisting force from the gravitational source. In other embodiments, one of the positive voltage source 112 or negative voltage source 114 is utilized, and an activated state results from one electrode connected to the ground source 110 and another electrode connected to the positive voltage source 112 or negative voltage source 114. Another way to address the electrodes 108 is by employing a local high voltage generator coupled to each of the pairs of electrodes 108. In this case, the high voltage generator simply receives common power and a low voltage signal from the controller 118 which tells it whether or not there needs to be differential voltage between the electrode pair (this is required to activate the electroadhesive region 106 and exert electroadhesive forces on the 120). If a differential voltage is required, then the local high voltage generator activates one electrode in each pair that it is connected to the one or more electrodes 108 as positive and negative. In some embodiments, the high voltage generator may switch the positive electrode to negative and vice versa to avoid charge build up in the electroadhesive material 106. In either scenario, the one or more electrodes 108 may be conductive brushes, such as carbon, metal, or conductive coated nylon brushes. In some embodiments, passive plastic rollers with conductive regions may be utilized and configured for the package and parcel transporting component 102 to ride upon.

The ground source 110 may be coupled to the one or more electrodes 108 and may be maintained at ground. The ground source 110 may be configured as a rail along the length of the package and parcel transporting component 102 (or the portion of the package and parcel transporting component 102 that has the one or more electrodes 108).

The positive high voltage source 112 may be coupled to the one or more electrodes 108 and may be maintained at a specific positive voltage, or varied. The positive voltage source 112 may be configured as a rail along the length of the package and parcel transporting component 102 (or the portion of the package and parcel transporting component 102 that has the one or more electrodes 108). The voltage of the positive voltage source 112 may be equal and opposite to the voltage of the negative voltage source 114.

The negative high voltage source 114 may be coupled to the one or more electrodes 108 and may be maintained at a specific negative voltage, or varied. The negative voltage source 114 may be configured as a rail along the length of the package and parcel transporting component 102 (or the portion of the package and parcel transporting component 102 that has the one or more electrodes 108). The voltage of the negative voltage source 114 may be equal and opposite to the voltage of the positive voltage source 112.

Figure 3:
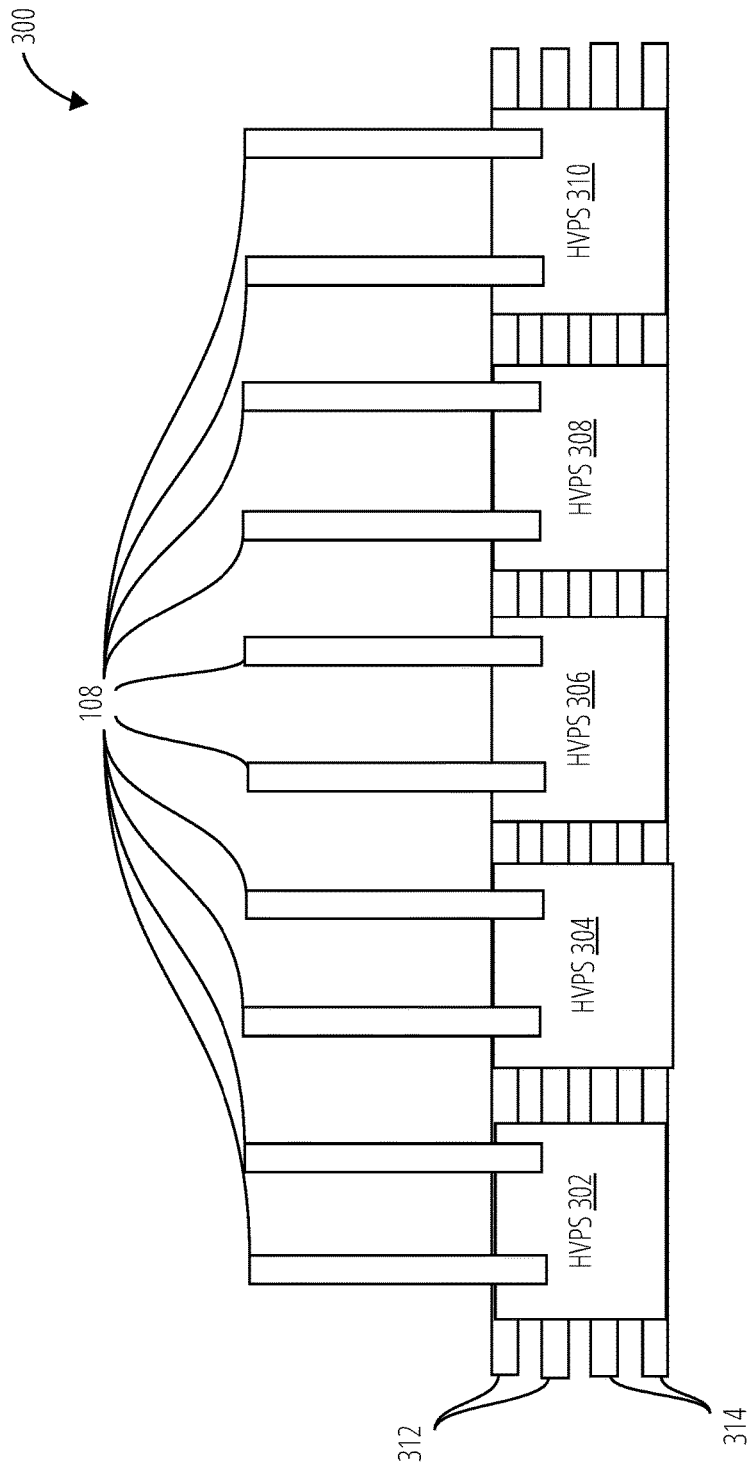
FIG. 3 illustrates an embodiment of an electrode voltage system 300.

In the case where the positive high voltage and negative high voltage are generated by a local high voltage generator (such as high voltage generator 302, high voltage generator 304, high voltage generator 306, high voltage generator 308, and high voltage generator 310), the electrodes 108 are similarly energized by the high voltage generator so that a differential voltage is maintained between the electrode pairs when an electroadhesive force is required. This differential voltage can be fixed or vary in magnitude or in polarity. As depicted in the electrode voltage system 300 in FIG. 3, the high voltage generator 302, high voltage generator 304, high voltage generator 306, high voltage generator 308, and high voltage generator 310 may receive low voltage power and ground 312 (e.g., 24V, 48V, 110V, etc.) and a low voltage signal 314 (from RS 485, Modbus, Prifibus, etc.) and activate or de-active the one or more electrodes 108 in response.

The sensor 116 is configured to sense the presence of one of the one or more packages or parcels 120 in each of the zone 104. The sensor 116 may comprise one or more of a camera, an infrared camera, an infrared sensor, a laser sensor, an ultrasound sensor, a RADAR sensor, or a LIDAR sensor. In some embodiments, the sensor 116 may include scanning the weight and/or the bar code and dimensions of the product as is commercially found in "scan tunnels" used in the warehouse logistics industry. In some embodiments, the information from the discrete sensor 116 may be replaced or augmented by the current in the electroadhesive circuits formed by the electroadhesive material 106, the one or more electrodes 108, and the one or more packages or parcels 120. The sensor 116 may sense the presence or absence of a parcel based on the electrical load (current) acting on the associated zone 104. This configuration may also be used as a mechanism for triggering parcel grip and release at the appropriate time, or possibly verifying that a parcel is discharged at the correct time. This information may be used in conjunction with, or instead of, the information coming from the one or more of a camera, an infrared camera, an infrared sensor, a laser sensor, an ultrasound sensor, a RADAR sensor, or a LIDAR sensor. The information is sent to the controller 118 as a control signal and utilized to associate each zone 104 with the one or more packages or parcels 120 or having none of the one or more packages or parcels 120.

The controller 118 receives control signals regarding the presence of the one or more packages or parcels 120 in each zone 104 from the sensor 116. The controller 118 may also determine the state of the one or more electrodes 108 (ground, positive, or negative) and send a control signal to alter the state of the one or more electrodes 108 and, thus alter the state of the electroadhesive material 106 and the zone 104. The controller 118 may also determine the one of one or more chutes 122 into which each of the one or more packages or parcels 120 may be placed. As the controller 118 may determine the movement of the package and parcel transporting component 102, the controller 118 may determine the location of each of the one or more packages or parcels 120 and send control signals to activate each of the one or more electrodes 108 to either cause the electroadhesive material 106 in a zone 104 to be in the activated state to adhere the associated parcel or in the de-activated state to detach the associated parcel.

The one or more packages or parcels 120 may be boxes, packets, or other objects that may adhere to the electroadhesive material 106 when activated. The one or more packages or parcels 120 may contact the surface of the package and parcel transporting component 102 and occupy one or more zone 104; however, the one or more packages or parcels 120 may slide off the package and parcel transporting component 102 due to the angle of the package and parcel transporting component 102 if all the electroadhesive zones 104 that it is in contact with are not activated. The one or more packages or parcels 120 may be received at the induct 124 at a first end of the package and parcel transporting component 102 and may be placed into one of the one or more chutes 122 at the second end or at an intermediate location between the induct 124 and the second end of the package and parcel transporting component 102.

The one or more chutes 122 receives the one or more packages or parcels 120 from the package and parcel transporting component 102 and may be sloped (e.g., 45 degree decline) to further transport the one or more packages or parcels 120 away from the package and parcel transporting component 102. The one or more chutes 122 may further comprise a non-sloped area for the one or more packages or parcels 120 to come to a resting state (i.e., not moving relative to the one or more chutes 122).

The induct 124 receives the one or more packages or parcels 120 may be sloped (e.g., 20 degree decline) to further transport the one or more packages or parcels 120 toward the package and parcel transporting component 102. The induct 124 may further comprise a non-sloped area for the one or more packages or parcels 120 to be in a resting state (i.e., not moving relative to the induct 124). The induct 124 may be a waterfall-style induct, whereby the induct 124 is aligned perpendicular to the receiving area for the one or more packages or parcels 120. One or more induct 124 may be utilized to transport the one or more packages or parcels 120 to the package and parcel transporting component 102. As the induct 124 is elevated and oriented perpendicular to the package and parcel transporting component 102, the area covered by each induct 124 may be reduced. Thus the number of packages and parcels transported may be increased for a given area. In some embodiments, the induct may include additional equipment that charges the bottom surface of the parcel or parcels or attaches adhesive layers to the packages to increase its strength of attraction to the electroadhesive transport components.

The mechanical guide 126 may be oriented near the package and parcel transporting component 102 to stop the movement of one of the one or more packages or parcels 120 that has been received by the package and parcel transporting component 102 from the induct 124. In some embodiments, the mechanical guide 126 comprises a conveyor belt or series of rollers that is oriented perpendicular to the transporting component 102 and moving at the same speed as the transporting component 102 so that there is no relative motion between the one or more packages or parcels 120, the package and parcel transporting component 102, and the conveyor belt embedded in the mechanical guide 126.

In some embodiments, the induct region (region to the right of the sensor 116 in FIG. 1) of the package and parcel transporting component 102 may comprise a parcel aligning component, such as a gate, a spring-loaded gate, a jittering mechanism, etc. to align the one or more packages or parcels 120 in a single file relative to the motion of the package and parcel transporting component 102. The package and parcel transporting component 102 may also comprise a different material near the top edge compared to the bottom edge, which may have differing frictional properties to help ensure the one or more packages or parcels 120 are single file. Such singulation may allow a mass of parcels 120 to enter the induct area without any order, thus simplifying the induction as a bulk package transporter.

In some embodiments, the package and parcel transporting component 102 may further comprise one or more package and parcel detaching components. The one or more package and parcel detaching components may be a pop-up roller or other surface under the surface of the package and parcel transporting component 102 upon which the one or more packages or parcels 120 contact. The controller 118 may send a control signal to the one or more package and parcel detaching components to cause the surface of the package and parcel transporting component 102 to deform such that the one or more packages or parcels 120 does not maintain contact across the entire surface of the package and parcel transporting component 102. During this state, the one or more packages or parcels 120 may slide into the one or more chutes 122 in less time. The one or more package and parcel detaching components may be located near each of the one or more chutes 122 and operated when one of the one or more packages or parcels 120 associated with the one or more chutes 122 (by the controller 118) is in a position to be released. The one or more package and parcel detaching components may also actively short the bus bars of the electroadhesive material 106.

In some embodiments, the package and parcel transporting component 102 may be a pre-existing, sorter that does not utilize the electroadhesive material 106. Such a package and parcel transporting component 102 may have the electroadhesive material 106 attached, modifications made to allow contacts by the one or more electrodes 108 (such as through openings made by cutting holes), and have further components added to operate the sorter system 100.

Figure 8:
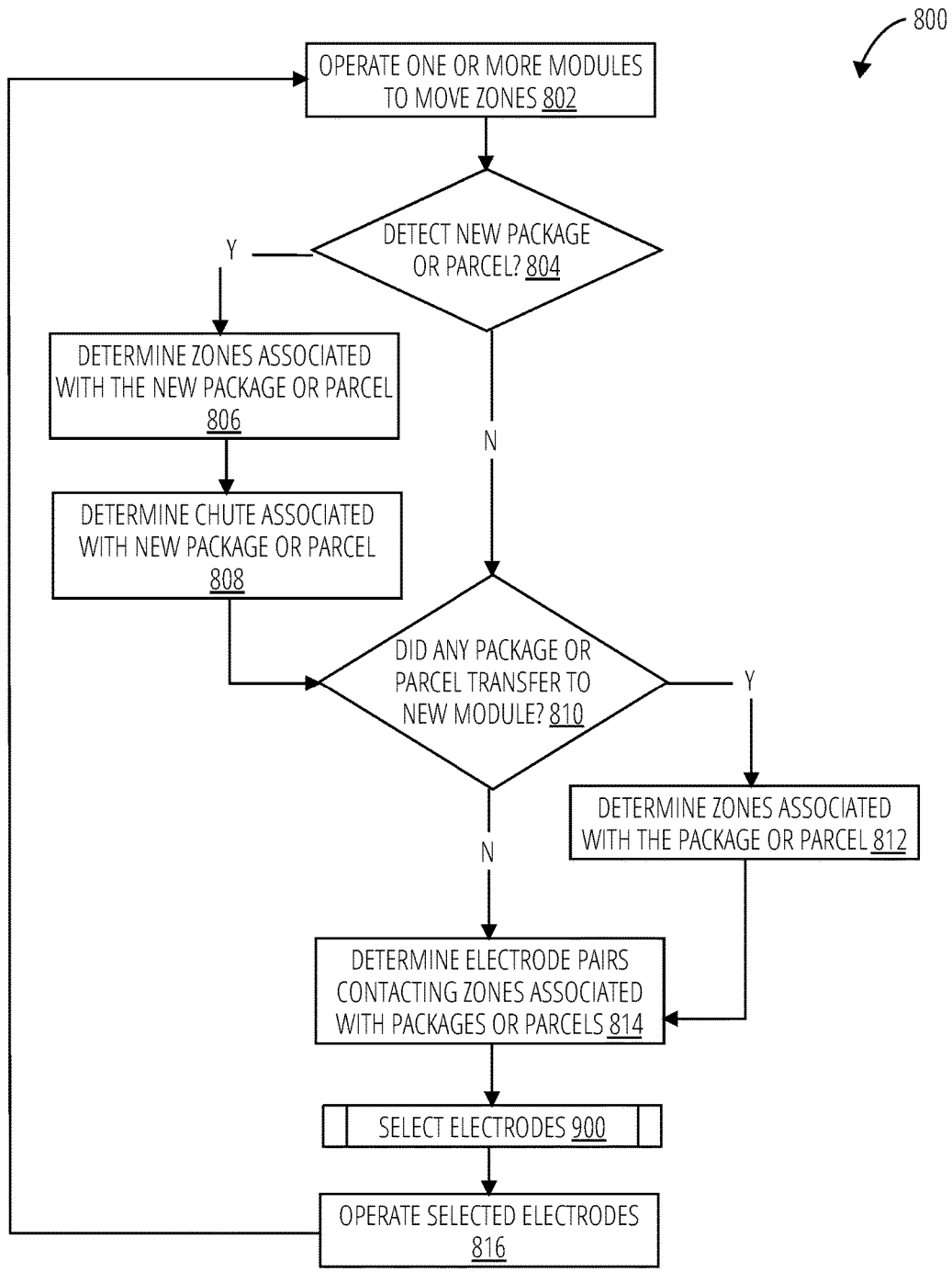
FIG. 8 illustrates an embodiment of a package and parcel sorting method 800.

The sorter system 100 may be operated in accordance with the process depicted in FIG. 8.

Figure 4:
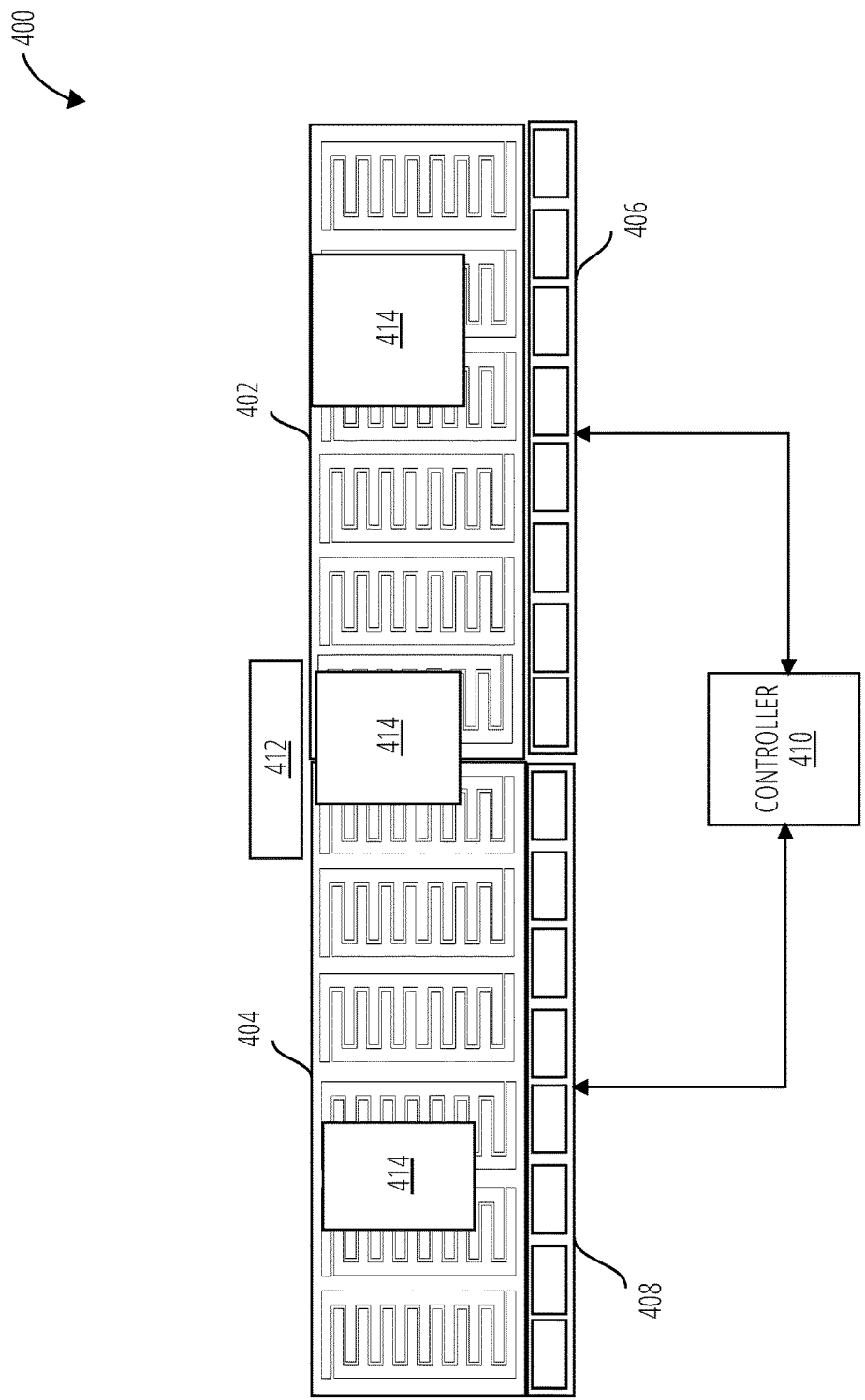
FIG. 4 illustrates an embodiment of a modular system 400.

Referring to FIG. 4, the modular system 400 comprises a first module 402, a second module 404, a first set of one or more electrodes 406, a second set of one or more electrodes 408, a controller 410, a mechanical guide 412, and one or more packages or parcels 414.

The first module 402 and the second module 404 may be a package and parcel transporting component that may operate independently of the other module. A plurality of modules may be utilized to transport the one or more packages or parcels 414. Each of the plurality of modules may have a plurality of zones and electroadhesive material associated with each of those plurality of zones.

The first set of one or more electrodes 406 and the second set of one or more electrodes 408 are associated with the first module 402 and the second module 404, respectively. The first set of one or more electrodes 406 and the second set of one or more electrodes 408 receive control signals from the controller 410 to couple to a voltage source (positive, negative, or ground) to alter the state of an associated zone.

The controller 410 may determine the zones associated with the one or more packages or parcels 414 and activate or de-active the first set of one or more electrodes 406 and the second set of one or more electrodes 408 to adhere the one or more packages or parcels 414 to the first module 402 or the second module 404. The controller 410 may determine that the one or more packages or parcels 414 have altered zones due to being transferred from the first module 402 to the second module 404 (or vice versa, based on direction of movement of the one or more packages or parcels 414). In some embodiments, the controller 410 is the same as the controller 118 shown in FIG. 1, and each electrode or high voltage generator in each module is connected through a commonly used industrial bus such as RS-485, Modbus or Profibus to the central controller 118.

The mechanical guide 412 may be located at the junction of the first module 402 and the second module 404 to preclude the one or more packages or parcels 414 from sliding off the first module 402 or the second module 404. In some embodiments, the mechanical guide 412 comprises a conveyor belt or series of rollers that is oriented perpendicular to the transporting component and moving at the same speed as the transporting component so that there is no relative motion between the one or more packages or parcels 414, the transporting component from the first module 402, transporting component from the second module 404, and the conveyor belt or rollers embedded in the mechanical guide 412.

The one or more packages or parcels 414 may be boxes, packets, or other objects that may adhere to the electroadhesive material when activated. The one or more packages or parcels 414 may contact the surface of the first module 402 of the second module 404; however, the one or more packages or parcels 414 may slide off the first module 402 or the second module 404 due to the angle of the modules.

In order to make transitions between the first module 402 and the second module 404 smoothly, the the speed of motion may be synchronized between the first module 402 and the second module 404. This may be accomplished by synchronizing the driving motor speeds of the two modules through the common industrial bus they are connected to. In some embodiments, external sensors, such as encoders, optical cameras or light interrupt sensors, may be used to successfully manage and get information about this transfer. In other cases, the currents from the electroadhesive circuit closed between the electrodes and the one or more packages or parcels 414 through the electroadhesive element may provide this feedback of which zones the package is located and re-synchronize the sortation in case there is some shifting of the one or more packages or parcels 414 across the transition between modules, or simply to check that the handoff has been completed without shift in packages.

Figure 5:
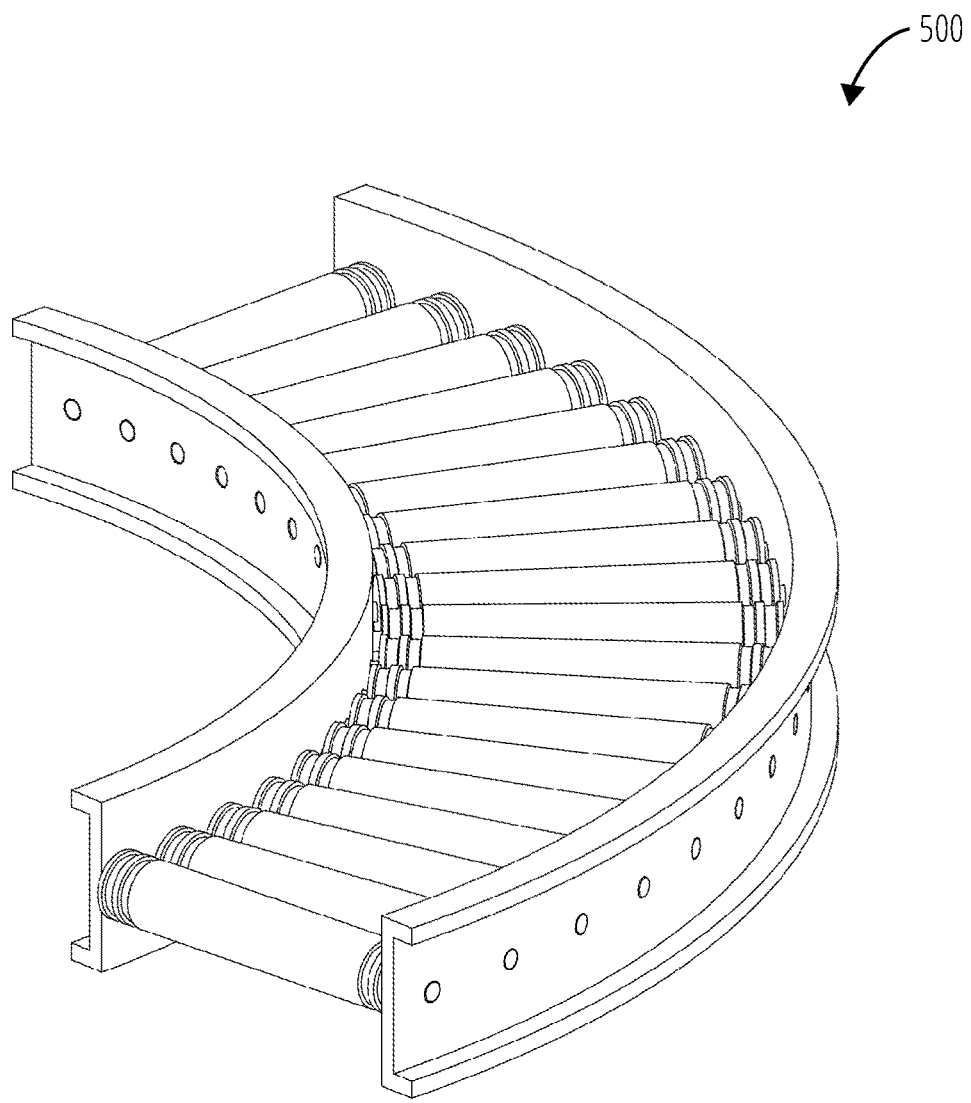
FIG. 5 illustrates a curved module 500 in accordance with one embodiment.
Figure 6:
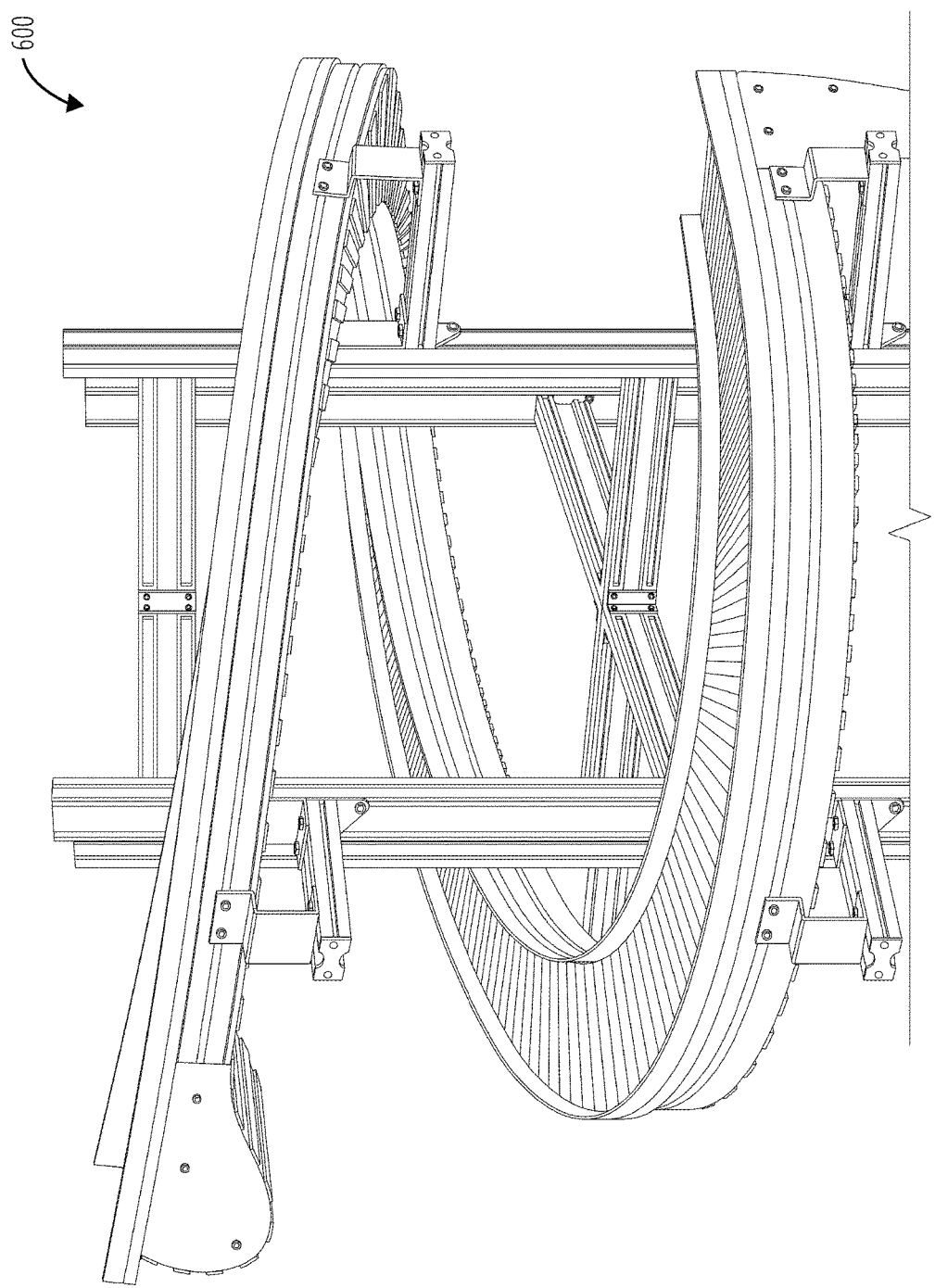
FIG. 6 illustrates a curved module 600 in accordance with one embodiment.

The plurality of modules may also include one or more curved modules, which may be utilized to alter the direction of the movement of the one or more packages or parcels 414. Exemplary curved modules are depicted as the curved module 500 and the curved module 600 in FIG. 5 and FIG. 6, respectively. The curved modules may include electroadhesive material or may be passive and just utilize the friction between the package and module to move the one or more packages or parcels 414 to the next module. Each module may include hard stops to hold the packages if there is no electroadhesion on the module (such as right angle module or a 180 degree module). The curved module may be left turns, right turns, or 180 degree turns. Further, the curved modules may allow a transition in angle so that they are not tilted in the same way that the straight modules (where sortation is occurring) but instead are flat sections. By adding straight modules and curved modules, the sortation loop may be configured to arbitrary shapes and capacity, depending on the application, warehouse space constraints and the number of discharge zones needed. Each type of module may have an ID associated with it, so that when configuring the sorter system, the master controller "knows" the geometry of the sorter and may synchronize accordingly. The modules themselves may either be made with belting (such as a conveyor belt or conveyor bands) or be made using overlapping slats (such as in an airport baggage carousel), or any combination thereof.

Figure 7:
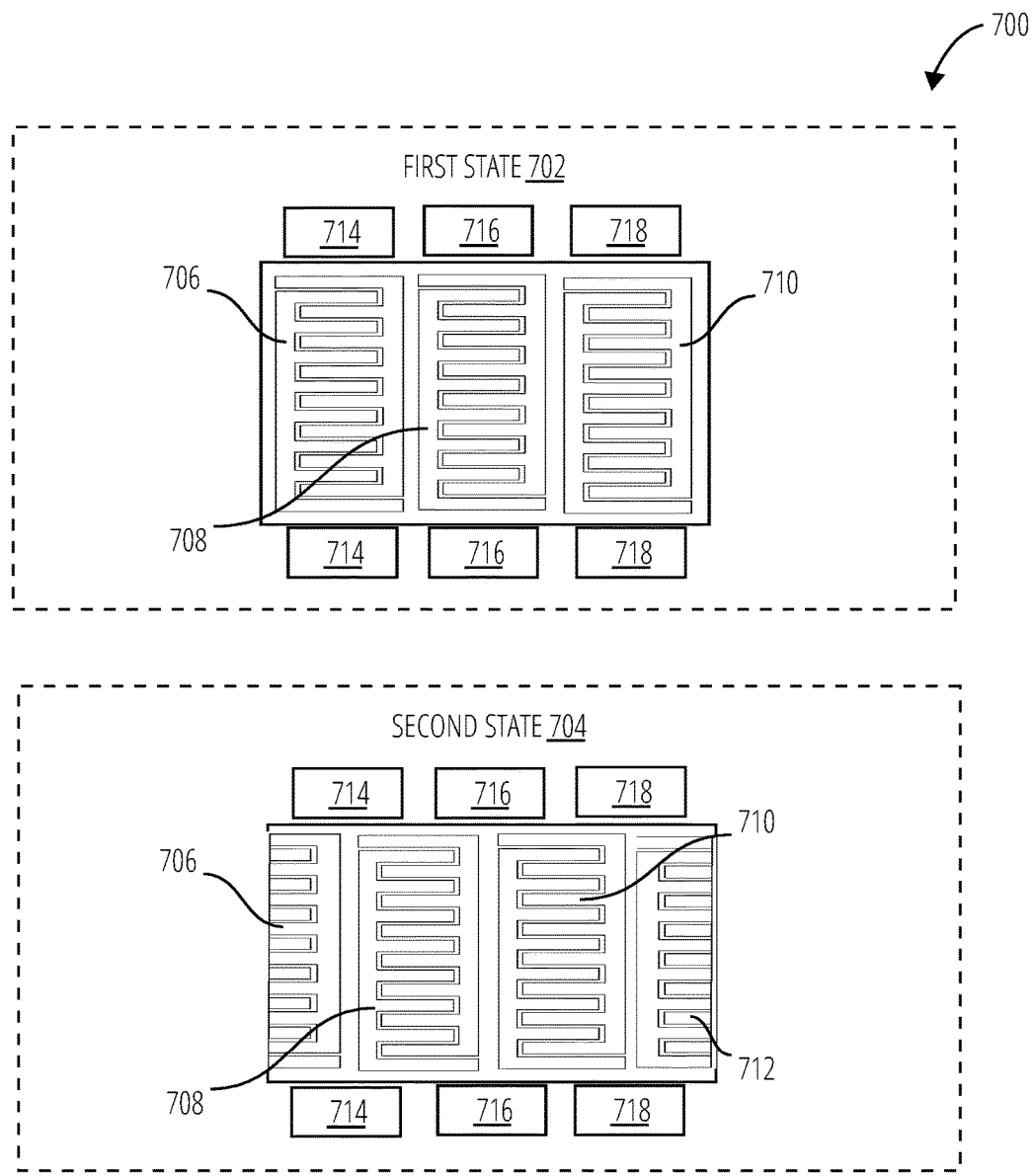
FIG. 7 illustrates an embodiment of a package and parcel transporting component 700.

Referring to FIG. 7, the package and parcel transporting component 700 comprises a first state 702 and a second state 704. The first state 702 comprises a zone 706, a zone 708, a zone 710, an electrode pair 714, an electrode pair 716, and an electrode pair 718. The second state 704 comprises the zone 706, the zone 708, the zone 710, a zone 712, the electrode pair 714, the electrode pair 716, and the electrode pair 718.

The first state 702 is a state in which a zone is aligned with one electrode pair. The zone 706 is aligned with the electrode pair 714. The zone 708 is aligned with the electrode pair 716. The zone 710 is aligned with the electrode pair 718. To activate the zone 706, the electrode pair 714 may be activated. To activate the zone 708, the electrode pair 716 may be activated. To activate the zone 710, the electrode pair 718 may be activated.

The second state 704 is a state in which a zone may be aligned with multiple electrode pairs. The zone 706 is aligned with the electrode pair 714. The zone 708 is aligned with the electrode pair 714 and the electrode pair 716. The zone 710 is aligned with the electrode pair 716 and the electrode pair 718. The zone 712 is aligned with the electrode pair 718. To activate the zone 706, the electrode pair 714 may be activated. To activate the zone 708, the electrode pair 714 or the electrode pair 716 may be activated. To activate the zone 710, the electrode pair 716 or the electrode pair 718 may be activated. To activate the zone 712, the electrode pair 718 or its neighbor may be activated.

A controller determining the electrodes to activate may determine the zones to be activated and each electrode pair associated with the zones, and activate the appropriate electrode pair. For example, the zone 708 may be determined to be in a de-activated state, whereas the zone 710 is determined to be in an activated state. Activating the electrode pair 716 induces both the zone 708 and the zone 710 to be in the activated state, thus failing the set conditions. Therefore, electrode pair 714 and electrode pair 716 may be inactive to allow zone 708 to be in the de-activated state, and electrode pair 718 may be active to allow the zone 710 to be in the activated state.

The width of each zone may be based on the minimum package or parcel width to help ensure that each package or parcel may be release into the associated chute and to maximize the spatial density across the entire sortation system.

Referring to FIG. 8, the package and parcel sorting method 800 operates the package and parcel transporting component to move the plurality of zones (block 802). The package and parcel sorting method 800 then determines whether a new package or parcel is detected (decision block 804). The sensor may send a signal to the controller, which determines the presence of a new package or parcel and its dimensions in applications where the parcels are different from each other. If a new package or parcel is detected, zones of the plurality of zones are associated with the new package or parcel (block 806). The controller may determine the location of each zone and switch it real time based on the operation of the one or more modules of the package, and speed of the transport module and parcel transporting component and the sensor signals. A chute is then associated with the new package or parcel (block 808).

If no new package or parcel is detected or once a chute is determined for the new package or parcel, the package and parcel sorting method 800 determines whether any package or parcel transferred to a new module (decision block 810). The end of a first module may be aligned with a second module, where operation of the first module transports the package or parcel to the second module. The controller may determine the transfer utilizing timing from the first module receiving the parcel, the elapse time, and the operating speed of the first module. If so, the new zones associated with the package or parcel are determined (block 812).

Once the new zones are determined or if no package or parcel transferred modules, the electrode pairs contacting zones associated with package or parcels are determined (block 814). The controller may determine the time from that last determination along with the speed of the package and parcel transporting component and the positions of the electrode pairs to determine which electrode pairs are contacting zones associated with packages or parcels.

Figure 9:
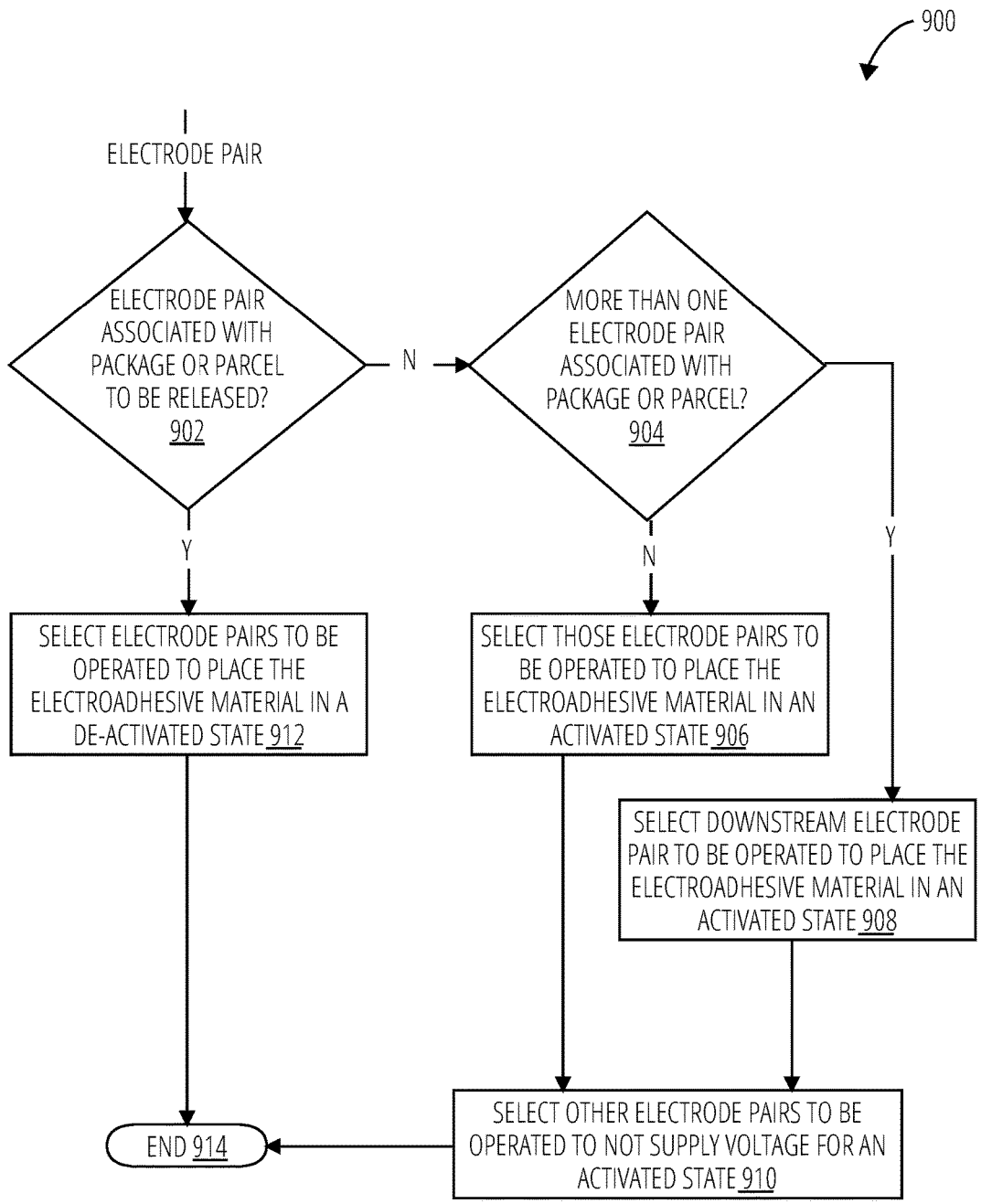
FIG. 9 illustrates an embodiment of an electrode selection method 900.

The electrode pairs to be operated are selected (electrode selection method 900). An exemplary process is depicted in FIG. 9. The selected electrodes are then operated to place each zone's electroadhesive material into an activated state or a de-activated state (block 816). After placing each zone's electroadhesive material into an activated state or a deactivated state, the package and parcel sorting method 800 returns to the block 802.

Referring to FIG. 9, the electrode selection method 900 determines for each pair whether the electrode pair is associated with a package or parcel to be released (decision block 902). If not, the electrode selection method 900 determines whether more than one electrode pair is associated with a package or parcel (decision block 904). If not, those electrode pairs are selected to be operated to place the electroadhesive material in an activated state (block 906). The electrode selection method 900 then selects other electrode pairs to be operated to not supply voltage for an activated state (block 910).

If there is more than one electrode pair associated with a package or parcel, then the electrode pair that is downstream of the other electrode pairs is selected to be operated to place the electroadhesive material into an activated state (block 908). In block 910, the electrode selection method 900 selects other electrode pairs to be operated to not supply voltage for an activated state. This process is performed for each package and parcel. The electrode pairs not selected to be operated to place an electroadhesive material into an activated state are selected to be operated to not supply voltage for an activated state (block 912). The process then ends (done block 914).

In some embodiments, the controller may perform a minimization algorithm to determine the minimum number of electrode pairs to activate to adhere the packages and parcels. The controller may also minimize the number of switches for the one or more electrode pairs. The controller may also operate all electrode pairs associated with a package or parcel unless operated to release a package or parcel. The controller may receive an input signal to determine the operation of the electrode pairs.

One of the key advantages of the current system is that there are minimal moving parts to push the package off at the right time, and gravity is relied upon instead. Another advantage is that the zones are narrow and fine-pitched, and the packages are assigned in software after the package gets scanned through the sensor. This allows minimization of gaps between packages, since the appropriate zones can be assigned wherever the packages happen to be. The need to locate the package spatially to coincide with zones is avoided because the zones are set by the package dimensions and location. This is in contrast with existing electromechanical existing sorters such as cross belt sorters, shoe sorters or tilt tray sorters which have a spatially fixed area with a significant width that is sortable. If the parcel is slightly larger than that fixed width zone, or is misaligned relative to that zone, two or three zones can be used up by that package, and no other packages can be allocated in any of those regions, which in turn decreases the spatial density of the sorters. This behavior also makes it extremely critical to induct the packages at precisely the right timing so that the package coincides with the pre-determined fixed zones, which in turn makes the inducts complex, very expensive and spatially large.

Figure 10:
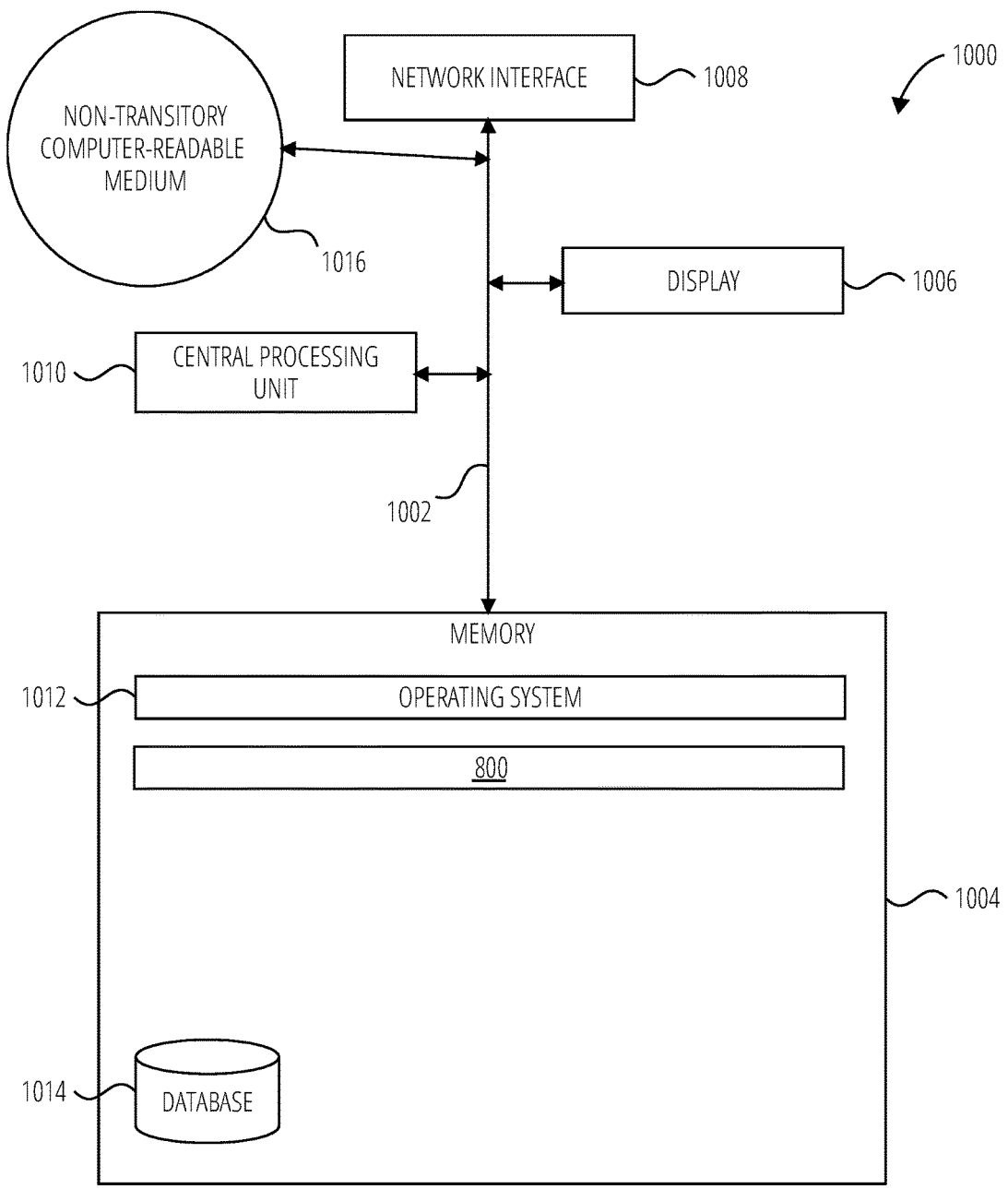
FIG. 10 illustrates a system 1000 in accordance with one embodiment.

FIG. 10 illustrates several components of an exemplary system 1000 in accordance with one embodiment. In various embodiments, system 1000 may include a desktop PC, server, workstation, mobile phone, laptop, tablet, set-top box, appliance, or other computing device that is capable of performing operations such as those described herein. In some embodiments, system 1000 may include many more components than those shown in FIG. 10. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 1000 may comprise one or more physical and/or logical devices that collectively provide the functionalities described herein. In some embodiments, system 1000 may comprise one or more replicated and/or distributed physical or logical devices.

In some embodiments, system 1000 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like. In some embodiments, the central processing unit 1010 may be interacting with Warehouse Management Systems like SAP, Manhattan Associates and the like. In other embodiments, it may be interacting with Warehouse Control Systems organized by the warehouse logistics provider like Knapp, Dematic, etc. In some embodiments it may be interacting with both.

System 1000 includes a bus 1002 interconnecting several components including a network interface 1008, a display 1006, a central processing unit 1010, and a memory 1004.

Memory 1004 generally comprises a random access memory ("RAM") and permanent non-transitory mass storage device, such as a hard disk drive or solid-state drive. Memory 1004 stores an operating system 1012.

These and other software components may be loaded into memory 1004 of system 1000 using a drive mechanism (not shown) associated with a non-transitory computer-readable medium 1016, such as a DVD/CD-ROM drive, memory card, network download, or the like.

Memory 1004 also includes database 1014. In some embodiments, system 1000 may communicate with database 1014 via network interface 1008, a storage area network ("SAN"), a high-speed serial bus, and/or via the other suitable communication technology.

In some embodiments, database 1014 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

What is claimed is:

1. A system to sort one or more packages or parcels into one or more chutes comprising:
   a package and parcel transporting component, the package and parcel transporting component tilted at an angle relative to a gravitational source to induce the one or more packages or parcels to move relative to the package and parcel transporting component unless a controlled external force is applied to it;
   the package and parcel transporting component comprising a plurality of zones, each of the plurality of zones coupled to an electroadhesive material, the electroadhesive material having a de-activated state and an activated state, the activated state precluding the one or more packages or parcels from moving relative to the package and parcel transporting component due to the gravitational source;
   the package and parcel transporting component operable to move the plurality of zones;
   one or more electrodes, each of the one or more electrodes to:
      exert an electroadhesive force on the one or more packages or parcels; and
      dynamically electrically couple to be energized by an applied voltage on demand;
   at least one sensor, the at least one sensor to determine two or more zones of the plurality of zones associated with the one or more packages or parcels; and
   a controller to:
      determine one of the one or more chutes into which to release each of the one or more packages or parcels;
      determine the two or more zones associated with each of the one or more packages or parcels;
      select one or more of the two or more zones associated with each of the one or more packages or parcels to transport or release each of the one or more packages or parcels; and
      operate the one or more electrodes to selectively couple between a ground source and a voltage source to alter the electroadhesive material in each of the one or more of the two or more zones associated with each of the one or more packages or parcels selected between the activated state and the de-activated state to transport and release the one or more packages or parcels to the one of the one or more chutes.

2. The system of claim 1, wherein the controller alters the one or more zones associated with one or more of the one or more packages or parcels based on the sensor detecting an additional package or parcel.

3. The system of claim 1, wherein each of the plurality of zones may be associated with two or more of the one or more packages or parcels.

4. The system of claim 1, wherein the plurality of zones have a width based on a minimum package or parcel width and a zone distance based on a minimum arc distance, the one or more zones associated with each of the one or more packages or parcels determined in response to being detected by the sensor, the sensor detecting a length of the one or more packages or parcels.

5. The system of claim 4, wherein the sensor detects a location and a dimension of the one or more packages or parcels to determine the one or more zones of the plurality of zones associated with the one or more packages or parcels.

6. The system of claim 1, wherein the package and parcel transporting component further comprises one or more openings, further comprising one or more vacuum generators, the one or more vacuum generators providing a vacuum force through the one or more openings to the one or more packages or parcels.

7. The system of claim 1, wherein the electroadhesive material is the sensor, the controller receiving an indication of an electric current of the electroadhesive material in each of the plurality of zones.

8. The system of claim 1, the one or more electrodes operate as one or more electrode pairs, one electrode of an electrode pair configured to couple to a positive voltage source and the other electrode of the electrode pair configured to couple to a negative voltage source.

9. The system of claim 1, wherein the one or more electrodes are one or more brushes, the package and parcel transporting component having one or more openings to enable the electroadhesive material to contact the one or more brushes.

10. The system of claim 1, further comprising one or more package and parcel detaching components.

11. The system of claim 1, the package and parcel transporting component comprising a plurality of modules, wherein:
    each of the plurality of modules:
       comprises two or more of the plurality of zones; and
       operates to move the two or more of the plurality of zones; and
    the controller determines which of the plurality of modules are associated with each of the one or more packages or parcels.

12. The system of claim 1, wherein selecting the one or more of the two or more zones associated with each of the one or more packages or parcels to transport or release each of the one or more packages or parcels further comprises:
    determining the one or more electrodes associated with each of the two or more zones associated with each of the one or more packages or parcels;
    determining which of the one or more electrodes to be in the de-activated state to release the one or more packages or parcels to be released; and
    selecting at least one of the one or more electrodes associated with one of the two or more zones associated with the one or more packages or parcels and not determined to be in the de-activated state to release the one or more packages or parcels to be released to be in the activated state.

13. The system of claim 1, further comprising one or more inducts coupled to and oriented perpendicular to the package and parcel transporting component to:
    receive the one or more packages or parcels; and
    send the one or more packages or parcels to the package and parcel transporting component.

14. The system of claim 13, wherein the package and parcel transporting component has a first end and a second end, the one or more inducts sending the one or more packages or parcels to the first end of the package and parcel transporting component and the package and parcel transporting component releasing the one or more packages or parcels into the one or more chutes at the second end.

15. A method comprising:
    receiving one or more packages or parcels;
    associating a package and parcel transporting component having a plurality of zones with the one or more packages or parcels;
    associating one or more zones of the plurality of zones with each of the one or more packages or parcels based on information provided by a sensor that detects a location and a dimension of the one or more packages or parcels;
    determining one of one or more chutes to release each of the one or more packages or parcels;
    operating the package and parcel transporting component at an angle tilted relative to a gravity force to move the one or more packages or parcels; and
    altering a state of an electroadhesive material associated with each of the plurality of zones to adhere or release the one or more packages or parcels to or from the package and parcel transporting component to:
        transport the one or more packages or parcels to the one or more chutes; and
        release each of the one or more packages or parcels into the one of the one or more chutes to which the one of the one or more packages or parcels is associated.

16. The method of claim 15, wherein each of the one or more packages or parcels is associated with one or more zones of the plurality of zones of the package and parcel transporting component in response to being detected by the sensor.

17. The method of claim 15, further comprising redetermining the one or more zones associated with each of the one or more packages or parcels in response to the sensor detecting an additional package or parcel.

18. The method of claim 15, wherein the package and parcel transporting component comprises a plurality of modules, the state of the electroadhesive material altered to further transfer each of the one or more packages or parcels from one of the plurality of modules to another of the plurality of modules.

19. The method of claim 15, further comprising:
    determining one or more electrodes associated with each of the two or more zones associated with each of the one or more packages or parcels;
    determining which of the one or more electrodes to be in a de-activated state to release the one or more packages or parcels to be released;
    selecting at least one of the one or more electrodes associated with one of the two or more zones associated with the one or more packages or parcels and not determined to be in the de-activated state to release the one or more packages or parcels to be released to be in an activated state; and
    activating the at least one of the one or more electrodes selected.

* * * * *